(12) United States Patent
Chen et al.

(10) Patent No.: US 9,773,589 B1
(45) Date of Patent: Sep. 26, 2017

(54) PTC CIRCUIT PROTECTION DEVICE

(71) Applicant: FUZETEC TECHNOLOGY CO., LTD., New Taipei (TW)

(72) Inventors: Jack Jih-Sang Chen, New Taipei (TW); Chang-Hung Jiang, New Taipei (TW)

(73) Assignee: FUZETEC TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/192,720

(22) Filed: Jun. 24, 2016

(51) Int. Cl.
| | |
|---|---|
| *H01C 7/10* | (2006.01) |
| *H01C 7/02* | (2006.01) |
| *H01C 1/14* | (2006.01) |
| *C08L 51/06* | (2006.01) |
| *C08L 23/06* | (2006.01) |

(52) U.S. Cl.
CPC ............. *H01C 7/028* (2013.01); *C08L 23/06* (2013.01); *C08L 51/06* (2013.01); *H01C 1/14* (2013.01); *C08L 2203/20* (2013.01); *C08L 2205/025* (2013.01); *C08L 2205/035* (2013.01)

(58) Field of Classification Search
CPC .................................. H01C 7/028; H01C 1/14
USPC ........................................................ 338/22 R
See application file for complete search history.

(56) References Cited

U.S. PATENT DOCUMENTS

| | | | | |
|---|---|---|---|---|
| 6,238,598 B1* | 5/2001 | Chen | ..................... | H01C 7/027 252/512 |
| 7,001,538 B2* | 2/2006 | Lee | ........................ | H01B 1/24 252/511 |
| 7,229,575 B2* | 6/2007 | Wang | ...................... | H01B 1/24 252/511 |
| 7,544,311 B2* | 6/2009 | Chen | ....................... | H01B 1/24 219/505 |
| 8,368,504 B1* | 2/2013 | Chen | ....................... | H01C 7/02 252/511 |
| 8,508,327 B2* | 8/2013 | Chen | ....................... | H01C 7/027 338/13 |
| 8,558,655 B1* | 10/2013 | Chen | ....................... | H01C 7/027 338/13 |

* cited by examiner

*Primary Examiner* — Kyung Lee
(74) *Attorney, Agent, or Firm* — Christensen O'Connor Johnson Kindness PLLC

(57) ABSTRACT

A PTC circuit protection device includes a PTC element and two electrodes attached to the PTC element. The PTC element includes a polymer matrix and a particulate conductive filler dispersed in the polymer matrix. The polymer matrix is made from a hetero-phase rheological polymer composition that contains first, second and third polyolefin components, the first, second and third polyolefin components being co-melted together and then solidified to form the polymer matrix. The first polyolefin component has a melt flow rate ranging from 0.1 to 2.5 g/10 min, the second polyolefin component has a melt flow rate ranging from 20 to 30 g/10 min, and the third polyolefin component has a melt flow rate of less than 0.00001 g/10 min measured under a temperature of 190° C. and a load of 2.16 Kg.

11 Claims, 1 Drawing Sheet

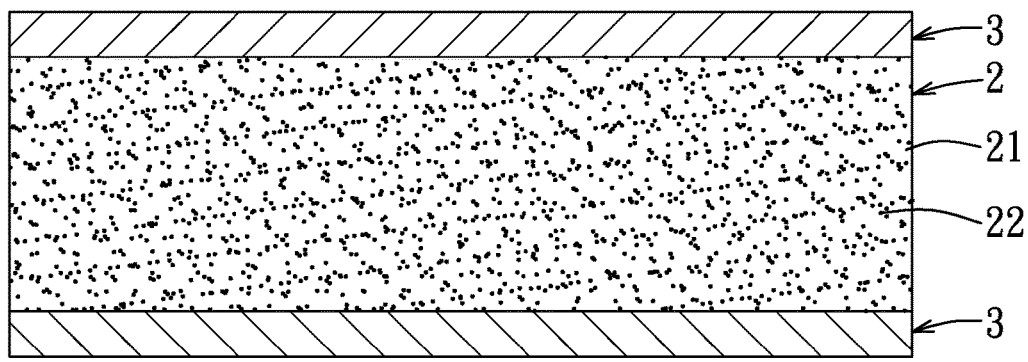

PTC CIRCUIT PROTECTION DEVICE

FIELD

The disclosure relates to a positive temperature coefficient (PTC) circuit protection device, and more particularly to a PTC circuit protection device including a PTC element containing three different polyolefin components.

BACKGROUND

A positive temperature coefficient (PTC) element exhibits a PTC effect that renders the same to be useful as a circuit protection device, such as a resettable fuse. The PTC circuit protection device includes a PTC element and first and second electrodes attached to two opposite surfaces of the PTC element. The PTC element includes a polymer matrix that contains a crystalline region and a non-crystalline region, and a particulate conductive filler, e.g., carbon-based filler, dispersed in the non-crystalline region of the polymer matrix and formed into a continuous conductive path for electrical conduction between the first and second electrodes. The PTC effect is a phenomenon where crystals in the crystalline region start to melt when the temperature of the polymer matrix is raised to its melting point, resulting in the generation of a new non-crystalline region. As the new non-crystalline region is increased to an extent to merge into the original non-crystalline region, the conductive path of the particulate conductive filler will become discontinuous and the resistance of the PTC element will be sharply increased, thereby resulting in an electrical disconnection between the first and second electrodes.

The PTC circuit protection device is required to exhibit a high positive temperature coefficient effect, high conductivity, and high electrical stability.

The polymer matrix of the conventional PTC element is made from a polymer composition containing non-grafted high density polyethylene (HDPE) and, optionally, carboxylic acid anhydride-grafted HDPE. The non-grafted HDPE has a weight average molecular weight ranging from 50,000 g/mole to 300,000 g/mole and a melt flow rate ranging from 0.01 g/10 min to 10 g/10 min according to ASTM D-1238 under 190° C. and a load of 2.16 Kg. The carboxylic acid anhydride-grafted HDPE has a weight average molecular weight ranging from 50,000 g/mole to 200,000 g/mole and a melt flow rate ranging from 0.5 g/10 min to 10 g/10 min according to ASTM D-1238 under 190° C. and a load of 2.16 Kg. The carboxylic acid anhydride-grafted HDPE functions to increase adhesion between the PTC element and the electrodes.

The carbon-based filler is not suitable for a PTC circuit protection device which requires high conductivity and relatively high maximum endurable voltage. The maximum endurable voltage may be improved by the addition of a non-conductive filler, e.g., an inorganic material. However, the conductivity of the PTC circuit protection device is still unsatisfactory.

SUMMARY

Therefore, an object of the disclosure is to provide a PTC circuit protection device that can alleviate at least one of the drawbacks of the prior art.

The PTC circuit protection device includes a PTC element and two electrodes attached to the PTC element.

The PTC element includes a polymer matrix and a particulate conductive filler dispersed in the polymer matrix. The polymer matrix is made from a hetero-phase rheological polymer composition that contains a first polyolefin component, a second polyolefin component and a third polyolefin component. The first polyolefin component, the second polyolefin component and the third polyolefin component are co-melted together and then solidified to form the polymer matrix. The first polyolefin component has a melt flow rate ranging from 0.1 g/10 min to 2.5 g/10 min measured under a temperature of 190° C. and a load of 2.16 Kg, and is present in an amount ranging from 2.5 to 75 wt % based on the weight of the polymer composition. The second polyolefin component has a melt flow rate ranging from 20 g/10 min to 30 g/10 min measured under a temperature of 190° C. and a load of 2.16 Kg, and is present in an amount ranging from 12.5 to 75 wt % based on the weight of the polymer composition. The third polyolefin component has a melt flow rate of less than 0.00001 g/10 min measured under a temperature of 190° C. and a load of 2.16 Kg, and is present in an amount ranging from 12.5 to 60 wt % based on the weight of the polymer composition.

BRIEF DESCRIPTION OF THE DRAWINGS

Other features and advantages of the disclosure will become apparent in the following detailed description of the embodiment with reference to the accompanying drawing, of which:

FIG. 1 is a schematic view of the embodiment of a PTC circuit protection device according to this disclosure.

DETAILED DESCRIPTION

Before the disclosure is described in greater detail, it should be noted that where considered appropriate, reference numerals or terminal portions of reference numerals have been repeated among the FIGURES to indicate corresponding or analogous elements, which may optionally have similar characteristics.

FIG. 1 illustrates the embodiment of a PTC circuit protection device that includes a PTC element 2 and two electrodes 3 attached to the PTC element 2.

The PTC element 2 has a volume resistivity greater than 0 Ω-cm and less than 0.3 Ω-cm, and includes a polymer matrix 21 and a particulate conductive filler 22 dispersed in the polymer matrix 21. The polymer matrix 21 is made from a hetero-phase rheological polymer composition that contains a first polyolefin component, a second polyolefin component and a third polyolefin component. The term "hetero-phase rheological polymer composition" refers to the polymer composition including polyolefin components having extremely different melt flow rates. The first, second and third polyolefin components are melt-extrudable and are co-melted together and then solidified to form the polymer matrix 21.

The first polyolefin component includes a non-grafted polyolefin and a grafted polyolefin. The grafted polyolefin functions to increase adhesion between the PTC element 2 and the electrodes 3. The first polyolefin component has a melt flow rate ranging from 0.1 g/10 min to 2.5 g/10 min measured under a temperature of 190° C. and a load of 2.16 Kg according to ASTM D-1238, and is present in an amount ranging from 2.5 to 75 wt % based on the weight of the polymer composition. The weight average molecular weight of the first polyolefin component ranges from 50,000 g/mole to 300,000 g/mole.

The second polyolefin component has a melt flow rate ranging from 20 g/10 min to 30 g/10 min measured under a temperature of 190° C. and a load of 2.16 Kg according to ASTM D-1238, and is present in an amount ranging from 12.5 to 75 wt % based on the weight of the polymer composition. The weight average molecular weight of the second polyolefin component ranges from 10,000 g/mole to 49,000 g/mole.

The third polyolefin component has a melt flow rate of less than 0.00001 g/10 min measured under a temperature of 190° C. and a load of 2.16 Kg according to ASTM D-1238, and is present in an amount ranging from 12.5 to 60 wt % based on the weight of the polymer composition. The weight average molecular weight of the third polyolefin component is not less than 5,000,000 g/mole. In certain embodiments, the weight average molecular weight of the third polyolefin component ranges from 5,000,000 g/mole to 10,500,000 g/mole.

In certain embodiments, the non-grafted polyolefin of the first polyolefin component, the second polyolefin component and the third polyolefin component are polyethylene (PE). In certain embodiments, the non-grafted polyolefin of the first polyolefin component, the second polyolefin component and the third polyolefin component are high density polyethylene (HDPE), and the grafted polyolefin is carboxylic acid anhydride-grafted high density polyethylene.

In certain embodiments, the particulate conductive filler 22 is carbon black.

In certain embodiments, the particulate conductive filler 22 is in an amount ranging from 40 to 60 wt % based on the weight of the PTC element 2.

In certain embodiments, the particulate conductive filler 22 has a particle size ranging from 40 to 100 nm, a DBP oil-absorption ranging from 60 to 120 cc/100 g, and an organic volatile content ranging from 0.2 to 2.0 wt %.

The following examples and comparative examples are provided to illustrate the embodiment of the disclosure, and should not be construed as limiting the scope of the disclosure.

EXAMPLES

Example 1 (E1)

7.875 grams of non-grafted HDPE (purchased from Formosa Plastics Corp., catalog no.: HDPE9007, having a weight average molecular weight of 120,000 g/mole and a melt flow rate of 0.8 g/10 min under a temperature of 190° C. and a load of 2.16 Kg) serving as the non-grafted polyolefin of the first polyolefin component, 7.875 grams of carboxylic acid anhydride-grafted HDPE (purchased from DuPont, catalog no.: MB100D, having a weight average molecular weight of 80,000 g/mole and a melt flow rate of 2.0 g/10 min under a temperature of 190° C. and a load of 2.16 Kg) serving as the grafted polyolefin of the first polyolefin component, 2.625 grams of HDPE (purchased from Formosa Plastics Corp., catalog no.: HDPE7200, having a weight average molecular weight of 40,000 g/mole and a melt flow rate of 22.0 g/10 min under a temperature of 190° C. and a load of 2.16 Kg) serving as the second polyolefin component; 2.625 grams of high density polyethylene (HDPE) (purchased from Ticona Corp., catalog no.: GUR4170, having a weight average molecular weight of 10,500,000 g/mole and a melt flow rate of less than 0.00001 g/10 min (about 0.0000001 g/10 min) under a temperature of 190° C. and a load of 2.16 Kg) serving as the third polyolefin component, and 29 grams of carbon black particles (trade name: Raven 430UB, average particle size: 82 nm, DBP oil-absorption: 75 cc/100 g, volatile content: 1.0 wt %, electrical conductivity: $2.86 \times 10^4 m^{-1} \Omega^{-1}$, commercially available from Columbian Chemicals Company) serving as the particulate conductive filler 22 were compounded in a Brabender mixer. The compounding temperature was 200° C., the stirring rate was 50 rpm, the applied pressure was 5 Kg, and the compounding time was 10 minutes. The compounded mixture was hot pressed so as to form a thin sheet of the PTC element 2 having a thickness of 0.35 mm. The hot pressing temperature was 200° C., the hot pressing time was 4 minutes, and the hot pressing pressure was 80 kg/cm². Two copper foil sheets (serving as the electrodes 3) were attached to two sides of the thin sheet and were hot pressed under 200° C. and 80 kg/cm² for 4 minutes to form a sandwiched structure of a PTC laminate which has a thickness of 0.42 mm. The PTC laminate was cut into a plurality of test samples with a size of 8 mm×8 mm. The electrical properties of the test samples were determined. The results are shown in Table 2.

The PTC element 2 formed in Example 1 has a composition containing 31.5 wt % of the first polyolefin component (the weight ratio of the non-grafted polyolefin to the grafted polyolefin is 1:1), 5.25 wt % of the second polyolefin component, 5.25 wt % of the third polyolefin component, and 58 wt % of the particulate conductive filler 22. In addition, the polymer matrix thus formed has a hetero-phase rheological polymer composition containing 75 wt % of the first polyolefin component, 12.5 wt % of the second polyolefin component, and 12.5 wt % of the third polyolefin component. The resistivity (ohm) and volume resistivity (ohm-cm) of Example 1 are shown in Table 2.

Examples 2-7 (E2-E7)

The procedures and conditions in preparing the test samples of Examples 2-7 (E2-E7) were similar to those of Example 1, except for the amounts of the first polyolefin component, the second polyolefin component, and the third polyolefin component (see Table 1). The electrical properties of the test samples of Examples 2-7 were determined. The results are shown in Table 2.

Examples 8-10 (E8-E10)

The procedures and conditions in preparing the test samples of Examples 8-10 (E8-E10) were similar to those of Examples 4-6, respectively, except for the species of the third polyolefin component employed.

The HDPE of the third polyolefin component employed for each of Examples 8-10 is available from Ticona company under a catalog no. GUR4120, having a weight average molecular weight of 5,000,000 g/mole and a melt flow rate of less than 0.000001 g/10 min(about 0.000001 g/10 min) measured under a temperature of 190° C. and a load of 2.16 Kg according to ASTM D-1238.

The electrical properties of the test samples of Examples 8-10 were determined. The results are shown in Table 2.

Comparative Example 1 (CE1)

The procedures and conditions in preparing the test samples of Comparative Example 1 (CE1) were similar to those of Example 1, except that the composition of the PTC element 2 of Comparative Example 1 was free of the second polyolefin component and the third polyolefin component (see Table 1). The electrical properties of the test samples of Comparative Example 1 were determined. The results are shown in Table 2.

Comparative Examples 2 to 4 (CE2-CE4)

The procedures and conditions in preparing the test samples of Comparative Examples 2 to 4 (CE2-CE4) were similar to those of Example 1, except that the compositions of the PTC elements 2 of Comparative Examples 2 to 4 were free of the third polyolefin component and the amounts of the first polyolefin component of the PTC elements were different (see Table 1). The electrical properties of the test samples of Comparative Examples 2 to 4 were determined. The results are shown in Table 2.

Comparative Examples 5 to 7 (CE5-CE7)

The procedures and conditions in preparing the test samples of Comparative Examples 5 to 7 (CE5-CE7) were similar to those of Example 1, except that the compositions of the PTC elements 2 of Comparative Examples 5 to 7 were free of the second polyolefin component and the amounts of the first and third polyolefin components of the PTC elements 2 were different (see Table 1). The electrical properties of the test samples of Comparative Examples 5 and 6 were determined. The results are shown in Table 2. The PTC element 2 of Comparative Example 7 could not be molded in the Brabender mixer, and thus there was no test sample for the performance tests.

Comparative Examples 8 and 9 (CE8-CE9)

The procedures and conditions in preparing the test samples of Comparative Examples 8 and 9 (CE8-CE9) were similar to those of Example 1, except that the amounts of the first and third polyolefin components of the PTC elements 2 were different (see Table 1). The PTC element 2 of Comparative Examples 8 and 9 cannot be molded in the Brabender mixer, and thus there was no test sample for the performance tests.

Comparative Examples 10 to 12 (CE10-CE12)

The procedures and conditions in preparing the test samples of Comparative Examples 10 to 12 (CE10-CE12) were similar to those of Examples 4 to 6, respectively, except for the species of the third polyolefin component employed.

The HDPE of the third polyolefin component employed for each of Comparative Examples 10-12 is available from Ticona company under a catalog no. GUR4012, having a weight average molecular weight of 1,500,000 g/mole and a melt flow rate of 0.00001 g/10 min under a temperature of 190° C. and a load of 2.16 Kg.

The electrical properties of the test samples of Comparative Examples 10-12 were determined. The results are shown in Table 2.

Comparative Example 13 (CE13)

The procedures and conditions in preparing the test samples of Comparative Example 13 (CE13) were similar to those of Comparative Example 6, except for the species of the third polyolefin component employed.

The HDPE of the third polyolefin component employed for Comparative Example 13 is available from Ticona company under a catalog no. GUR4012, having a weight average molecular weight of 1,500,000 g/mole and a melt flow rate of 0.00001 g/10 min under a temperature of 190° C. and a load of 2.16 Kg.

The electrical properties of the test samples of Comparative Example 13 were determined. The results are shown in Table 2.

TABLE 1

| | Non-grafted polyolefin HDPE9007 | | Grafted polyolefin MB100D | | Second polyolefin component HDPE7200 | | Third polyolefin component | | | Carbon black |
|---|---|---|---|---|---|---|---|---|---|---|
| | % of the PTC element | % of the polymer composition | % of the PTC element | % of the polymer composition | % of the PTC element | % of the polymer composition | Catalog no. | % of the PTC element | % of the polymer composition | Raven 430UB % of the PTC element |
| E1 | 15.750 wt% | 37.50 wt% | 15.750 wt% | 37.50 wt% | 5.250 wt% | 12.50 wt% | GUR4170 | 5.250 wt% | 12.50 wt% | 58 wt% |
| E2 | 10.500 wt% | 25.00 wt% | 10.500 wt% | 25.00 wt% | 5.250 wt% | 12.50 wt% | GUR4170 | 15.750 wt% | 37.50 wt% | 58 wt% |
| E3 | 5.875 wt% | 13.99 wt% | 5.875 wt% | 13.99 wt% | 5.250 wt% | 12.50 wt% | GUR4170 | 25.000 wt% | 59.52 wt% | 58 wt% |
| E4 | 10.500 wt% | 25.00 wt% | 10.500 wt% | 25.00 wt% | 15.750 wt% | 37.50 wt% | GUR4170 | 5.250 wt% | 12.50 wt% | 58 wt% |
| E5 | 5.250 wt% | 12.50 wt% | 5.250 wt% | 12.50 wt% | 15.750 wt% | 37.50 wt% | GUR4170 | 15.750 wt% | 37.50 wt% | 58 wt% |
| E6 | 0.625 wt% | 1.49 wt% | 0.625 wt% | 1.49 wt% | 15.750 wt% | 37.50 wt% | GUR4170 | 25.000 wt% | 59.52 wt% | 58 wt% |
| E7 | 2.625 wt% | 6.25 wt% | 2.625 wt% | 6.25 wt% | 31.500 wt% | 75.00 wt% | GUR4170 | 5.250 wt% | 12.50 wt% | 58 wt% |
| E8 | 10.500 wt% | 25.00 wt% | 10.500 wt% | 25.00 wt% | 15.750 wt% | 37.50 wt% | GUR4120 | 5.250 wt% | 12.50 wt% | 58 wt% |
| E9 | 5.250 wt% | 12.50 wt% | 5.250 wt% | 12.50 wt% | 15.750 wt% | 37.50 wt% | GUR4120 | 15.750 wt% | 37.50 wt% | 58 wt% |
| E10 | 0.625 wt% | 1.49 wt% | 0.625 wt% | 1.49 wt% | 15.750 wt% | 37.50 wt% | GUR4120 | 25.000 wt% | 59.52 wt% | 58 wt% |
| CE1 | 21.000 wt% | 50.00 wt% | 21.000 wt% | 50.00 wt% | 0 | 0 | — | 0 | 0 | 58 wt% |
| CE2 | 18.375 wt% | 43.75 wt% | 18.375 wt% | 43.75 wt% | 5.250 wt% | 12.50 wt% | — | 0 | 0 | 58 wt% |
| CE3 | 13.125 wt% | 31.25 wt% | 13.125 wt% | 31.25 wt% | 15.750 wt% | 37.50 wt% | — | 0 | 0 | 58 wt% |
| CE4 | 5.250 wt% | 12.50 wt% | 5.250 wt% | 12.50 wt% | 31.500 wt% | 75.00 wt% | — | 0 | 0 | 58 wt% |
| CE5 | 18.375 wt% | 43.75 wt% | 18.375 wt% | 43.75 wt% | 0 | 0 | GUR4170 | 5.250 wt% | 12.50 wt% | 58 wt% |
| CE6 | 13.125 wt% | 31.25 wt% | 13.125 wt% | 31.25 wt% | 0 | 0 | GUR4170 | 15.750 wt% | 37.50 wt% | 58 wt% |
| CE7 | 8.000 wt% | 19.05 wt% | 8.000 wt% | 19.05 wt% | 0 | 0 | GUR4170 | 26.000 wt% | 61.90 wt% | 58 wt% |
| CE8 | 5.375 wt% | 12.80 wt% | 5.375 wt% | 12.80 wt% | 5.250 wt% | 12.50 wt% | GUR4170 | 26.000 wt% | 61.90 wt% | 58 wt% |
| CE9 | 0.125 wt% | 0.30 wt% | 0.125 wt% | 0.30 wt% | 15.750 wt% | 37.50 wt% | GUR4170 | 26.000 wt% | 61.90 wt% | 58 wt% |
| CE10 | 10.500 wt% | 25.00 wt% | 10.500 wt% | 25.00 wt% | 15.750 wt% | 37.50 wt% | GUR4012 | 5.250 wt% | 12.50 wt% | 58 wt% |
| CE11 | 5.250 wt% | 12.50 wt% | 5.250 wt% | 12.50 wt% | 15.750 wt% | 37.50 wt% | GUR4012 | 15.750 wt% | 37.50 wt% | 58 wt% |
| CE12 | 0.625 wt% | 1.49 wt% | 0.625 wt% | 1.49 wt% | 15.750 wt% | 37.50 wt% | GUR4012 | 25.000 wt% | 59.52 wt% | 58 wt% |
| CE13 | 13.125 wt% | 31.25 wt% | 13.125 wt% | 31.25 wt% | 0 | 0 | GUR4012 | 15.750 wt% | 37.50 wt% | 58 wt% |

TABLE 2

| | Resistance (Ω) | Volume resistivity (Ω-cm) | Average value of R140 (Ω) | Breakdown test Passing rate | Endurance Average value of $\frac{|Rf - Ri|}{Ri}$ | Passing rate | Thermal runaway test Maximum endurable voltage (Vdc) |
|---|---|---|---|---|---|---|---|
| E1  | 0.0180 | 0.274 | 1002.58 | 100% | 53%  | 100% | 64.0 |
| E2  | 0.0185 | 0.287 | 862.56  | 100% | 67%  | 100% | 64.0 |
| E3  | 0.0188 | 0.286 | 815.94  | 100% | 62%  | 100% | 64.0 |
| E4  | 0.0175 | 0.267 | 1089.30 | 100% | 55%  | 100% | 64.0 |
| E5  | 0.0179 | 0.273 | 992.04  | 100% | 71%  | 100% | 64.0 |
| E6  | 0.0185 | 0.282 | 907.32  | 100% | 69%  | 100% | 64.0 |
| E7  | 0.0170 | 0.259 | 1071.90 | 100% | 53%  | 100% | 64.0 |
| E8  | 0.0179 | 0.273 | 1002.10 | 100% | 63%  | 100% | 64.0 |
| E9  | 0.0181 | 0.276 | 982.43  | 100% | 59%  | 100% | 64.0 |
| E10 | 0.0182 | 0.277 | 995.11  | 100% | 58%  | 100% | 64.0 |
| CE1 | 0.0205 | 0.312 | 553.80  | 0%   | NA   | NA   | 32.0 |
| CE2 | 0.0200 | 0.305 | 597.84  | 20%  | 134% | 10%  | 35.2 |
| CE3 | 0.0193 | 0.294 | 573.60  | 10%  | 143% | 10%  | 35.2 |
| CE4 | 0.0191 | 0.291 | 419.58  | 0%   | NA   | NA   | 32.0 |
| CE5 | 0.0201 | 0.306 | 573.00  | 20%  | 155% | 10%  | 35.2 |
| CE6 | 0.0209 | 0.318 | 340.92  | 20%  | 146% | 10%  | 35.2 |
| CE7 | NA | NA | NA | NA | NA | NA | NA |
| CE8 | NA | NA | NA | NA | NA | NA | NA |
| CE9 | NA | NA | NA | NA | NA | NA | NA |
| CE10 | 0.0198 | 0.302 | 489.00 | 20% | 135% | 10% | 35.2 |
| CE11 | 0.0199 | 0.303 | 492.97 | 30% | 141% | 10% | 35.2 |
| CE12 | 0.0196 | 0.299 | 507.21 | 20% | 145% | 10% | 35.2 |
| CE13 | 0.0205 | 0.312 | 387.34 | 20% | 150% | 10% | 35.2 |

"NA" means none or not available.

Performance Test

Resistances at Different Temperatures

Ten test samples for each of E1-E10, CE1-CE6 and CE10-CE13 were subjected to a resistance test to determine the resistances thereof at temperatures between 25 and 185° C.

The resistance test for each test sample was conducted by increasing stepwise the temperature applied to each test sample from an initial temperature of 25° C. to a final temperature of 185° C. under a fixed rate of 2° C./min. The resistance of each of the test samples of E1-E10, CE1-CE6 and CE10-CE13 under every temperature was recorded. The results of the resistance test are shown in Table 2.

The higher the resistance of the PTC laminate under the same temperature, the higher the working voltage of the PTC laminate. The results show that Examples 1-10 can be operated under a higher working voltage than that of Comparative Examples 1-6 and 10-13. For instance, E1 has a resistance of 1002.58 ohm under 140° C., which is higher than that of CE1 having a resistance of 553.80 ohm under 140° C.

Breakdown Test

Ten test samples for each of E1-E10, CE1-CE6 and CE10-CE13 were subjected to a breakdown test to determine the passing rate of the test samples of each of E1-E10, CE1-CE6 and CE10-CE13 at which the test samples were not burned down (n/10×100%, n represents the number of the test samples passing the breakdown test without burning down). The breakdown test was conducted under a DC voltage of 32V and a current of 100 A for 60 seconds.

The results of the breakdown test are shown in Table 2.

Table 2 shows that the passing rates of E1-E10 (all 100%) are much higher than those of CE1-CE6 and CE10-CE13 (0 to 30%) under 32 Vdc. The passing rate of CE1 (without the second and third polyolefin components) is 0%. The passing rates of CE2-CE4 (without the third polyolefin component) are 0-20%. Each of the passing rates of CE5-CE6 and CE13 (without the second polyolefin component) is 20%. The passing rates of CE10-CE12 (the third polyolefin component is GUR4012) are 20-30%. It demonstrates that with the second and third polyolefin components, and the third polyolefin component having a melt flow rate of less than 0.00001 g/10 min, the test samples have excellent performance in this test. Hence, it may be assumed that a melt flow phenomenon may occur at the kneading temperature (200° C.) between the second and third polyolefin components, and the second and third components further melted with the first polyolefin component, so as to increase the structural strength and enhance the electrical stability of the PTC circuit protection device.

Endurance Test

The PTC elements of E1-E10, CE1-CE6 and CE10-CE13 were subjected to an endurance test under the conditions of 32 Vdc/10 A, and in a power-on state for 60 seconds and in a power-off state for 60 seconds for 7200 cycles. In each of the examples and comparative examples, 10 PTC elements were used to perform the endurance test in each condition, and the resistance variation between the resistance after test (Rf) and resistance before test (Ri) and passing rate of the PTC elements (number of the PTC elements that pass the endurance test/10 PTC elements) were recorded. The results are shown in Table 2.

Table 2 shows that the test samples of CE1 and CE4 have been burned down completely during the endurance test, and the test samples of each of E1-E10 have a pass ratio of 100% which is superior to those of CE2-CE3, CE5-CE6, and CE10-CE13.

Thermal Runaway Test

Five test samples for each of E1-E10, CE1-CE6 and CE10-CE13 were subjected to a thermal runaway test. The thermal runaway test for each test sample was conducted by increasing stepwise the voltage applied to each test sample from an initial voltage of 32 Vdc (current of 100 A, 23° C.) to a final voltage of 64 Vdc that is sufficient to enable each test sample to be burned down. The applied voltage was increased at an increment of 3.2 Vdc per step and the duration for each step was 2 minutes (i.e., each newly applied voltage lasted for two minutes). The maximum endurable voltage of each of the test samples of E1-E10, CE1-CE6 and CE10-CE13 was recorded. The results of the thermal runaway test are shown in Table 2.

Table 2 shows that the breakdown voltages of E1-E10 (64V) are much higher than those of CE1-CE6 and CE10-CE13 (32 to 35.2V), which demonstrates that the PTC circuit protection device of the disclosure can be operated at a higher voltage.

In conclusion, with the inclusion of the first, second and third polyolefin components in the hetero-phase rheological polymer composition of the PTC element 2 of the PTC circuit protection device of the present disclosure, the maximum endurable voltage and the electrical stability of the PTC circuit protection device may be improved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, FIGURE, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A PTC circuit protection device comprising:
   a PTC element; and
   two electrodes attached to said PTC element;
   wherein said PTC element includes a polymer matrix and a particulate conductive filler dispersed in said polymer matrix;
   wherein said polymer matrix is made from a hetero-phase rheological polymer composition that contains a first polyolefin component, a second polyolefin component and a third polyolefin component, said first polyolefin component, said second polyolefin component and said third polyolefin component being co-melted together and then solidified to form said polymer matrix;
   wherein said first polyolefin component has a melt flow rate ranging from 0.1 g/10 min to 2.5 g/10 min measured under a temperature of 190° C. and a load of 2.16 Kg, and is present in an amount ranging from 2.5 to 75 wt % based on the weight of said polymer composition,
   wherein said second polyolefin component has a melt flow rate ranging from 20 g/10 min to 30 g/10 min measured under a temperature of 190° C. and a load of 2.16 Kg, and is present in an amount ranging from 12.5 to 75 wt % based on the weight of said polymer composition,
   wherein said third polyolefin component has a melt flow rate of less than 0.00001 g/10 min measured under a temperature of 190° C. and a load of 2.16 Kg, and is present in an amount ranging from 12.5 to 60 wt % based on the weight of said polymer composition.

2. The PTC circuit protection device of claim 1, wherein the weight average molecular weight of said first polyolefin component ranges from 50,000 g/mole to 300,000 g/mole.

3. The PTC circuit protection device of claim 2, wherein the weight average molecular weight of said second polyolefin component ranges from 10,000 g/mole to 49,000 g/mole.

4. The PTC circuit protection device of claim 2, wherein the weight average molecular weight of said third polyolefin component is not less than 5,000,000 g/mole.

5. The PTC circuit protection device of claim 4, wherein the weight average molecular weight of said third polyolefin component ranges from 5,000,000 g/mole to 10,500,000 g/mole.

6. The PTC circuit protection device of claim 1, wherein said first polyolefin component includes a non-grafted polyolefin and a grafted polyolefin.

7. The PTC circuit protection device of claim 6, wherein said non-grafted polyolefin, said second polyolefin component and said third polyolefin component are high density polyethylene, and said grafted polyolefin is carboxylic acid anhydride-grafted high density polyethylene.

8. The PTC circuit protection device of claim 1, wherein said particulate conductive filler is carbon black.

9. The PTC circuit protection device of claim 1, wherein said particulate conductive filler is in an amount ranging from 40 to 60 wt % based on the weight of said PTC element.

10. The PTC circuit protection device of claim 1, wherein said particulate conductive filler has a particle size ranging from 40 to 100 nm, a DBP oil-absorption ranging from 60 to 120 cc/100, and a volatile content ranging from 0.2 to 2.0 wt %.

11. The PTC circuit protection device of claim 1, wherein said non-grafted polyolefin, said second polyolefin component and said third polyolefin component are polyethylene.

* * * * *